(12) United States Patent
Kunieda et al.

(10) Patent No.: US 10,570,492 B2
(45) Date of Patent: Feb. 25, 2020

(54) TITANIUM CAST PRODUCT FOR HOT ROLLING HAVING EXCELLENT SURFACE PROPERTIES AFTER HOT ROLLING EVEN WHEN SLABBING STEP AND FINISHING STEP ARE OMITTED, AND METHOD FOR PRODUCING SAME

(71) Applicant: NIPPON STEEL & SUMITOMO METAL CORPORATION, Tokyo (JP)

(72) Inventors: Tomonori Kunieda, Tokyo (JP); Yoshitsugu Tatsuzawa, Tokyo (JP); Kenichi Mori, Tokyo (JP); Hideki Fujii, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 289 days.

(21) Appl. No.: 15/513,856

(22) PCT Filed: Sep. 30, 2014

(86) PCT No.: PCT/JP2014/076103
§ 371 (c)(1),
(2) Date: Mar. 23, 2017

(87) PCT Pub. No.: WO2016/051511
PCT Pub. Date: Apr. 7, 2016

(65) Prior Publication Data
US 2017/0283928 A1 Oct. 5, 2017

(51) Int. Cl.
*C22F 1/18* (2006.01)
*B22D 15/00* (2006.01)
(Continued)

(52) U.S. Cl.
CPC .............. *C22F 1/183* (2013.01); *B22D 15/00* (2013.01); *B22D 21/06* (2013.01); *B23K 15/00* (2013.01); *C22F 3/02* (2013.01)

(58) Field of Classification Search
CPC ....................................................... B23K 15/00
See application file for complete search history.

(56) References Cited

U.S. PATENT DOCUMENTS

| 4,690,875 A * | 9/1987 | Hunt | B22D 7/10 148/425 |
| 2008/0035298 A1* | 2/2008 | Yu | B22D 11/22 164/455 |

(Continued)

FOREIGN PATENT DOCUMENTS

| CN | 102307682 A | 1/2012 |
| CN | 102307685 A | 1/2012 |

(Continued)

OTHER PUBLICATIONS

Machine translation of Kenichi et al., JP2007332420(A).*

(Continued)

*Primary Examiner* — Ian A Rummel
(74) *Attorney, Agent, or Firm* — Birch, Stewart, Kolasch & Birch, LLP

(57) ABSTRACT

Provided is a titanium cast product for hot rolling made of commercial pure titanium or a titanium alloy, the titanium cast product including, in a surface serving as a rolling surface, a fine structure layer that is formed of an acicular structure formed in the outermost surface by melting and re-solidification treatment and that has a thickness of more than or equal to 5 mm and less than 9 mm in depth. In the titanium cast product for hot rolling according to the present invention, the surface is flat, the number of minute voids in the interior immediately below the surface is small, and the outermost surface has a significantly fine structure. When the titanium cast product is subjected to hot rolling, the occurrence of concavities on the surface in the early stage of (Continued)

hot rolling and the occurrence of surface defects on the hot rolled sheet can be stably prevented at a practical level.

8 Claims, 5 Drawing Sheets

(51) Int. Cl.
*B22D 21/06* (2006.01)
*B23K 15/00* (2006.01)
*C22F 3/02* (2006.01)

(56) References Cited

U.S. PATENT DOCUMENTS

| | | |
|---|---|---|
| 2011/0318597 A1 | 12/2011 | Takahashi et al. |
| 2014/0027024 A1 | 1/2014 | Tatsuzawa et al. |
| 2016/0038983 A1 | 2/2016 | Fujii et al. |

FOREIGN PATENT DOCUMENTS

| | | |
|---|---|---|
| CN | 103348029 A | 10/2013 |
| CN | 103459063 A | 12/2013 |
| EP | 2982777 A1 | 2/2016 |
| JP | 2007-332420 A | 12/2007 |
| WO | WO 2010/090352 A1 | 8/2010 |
| WO | WO 2012/144561 A1 | 10/2012 |
| WO | WO 2014/163089 A1 | 10/2014 |

OTHER PUBLICATIONS

International Search Report (PCT/ISA/210) issued in PCT/JP2014/076103, dated Apr. 7, 2015.
Written Opinion (PCT/ISA/237) issued in PCT/JP2014/076103, dated Apr. 7, 2015.
Chinese Office Action and Search Report, dated Feb. 5, 2018, for corresponding Chinese Application No. 201480082160.3.
Extended European Search Report, dated Feb. 9, 2018, for corresponding European Application No. 14903062.9.
European Office Action for corresponding European Application No. 14903062.9, dated Jan. 25, 2019.

* cited by examiner (a)

(b)

TITANIUM CAST PRODUCT FOR HOT ROLLING HAVING EXCELLENT SURFACE PROPERTIES AFTER HOT ROLLING EVEN WHEN SLABBING STEP AND FINISHING STEP ARE OMITTED, AND METHOD FOR PRODUCING SAME

TECHNICAL FIELD

The present invention relates to a titanium cast product for hot rolling and a method for producing the same, and relates particularly to a titanium cast product that can keep surface properties after hot rolling satisfactory even when a slabbing step and a finishing step are omitted, and a method for producing the same.

BACKGROUND ART

In general, a commercial pure titanium has usually been processed such that, using sponge titanium obtained by the Kroll method or titanium scrap as the melting material, the material is melted by vacuum arc remelting (VAR), electron beam remelting (EBR), or the like to be made into a large-sized cast product (an ingot). Here, as the shape of the cast product, only a circular columnar cast product (a billet) is possible in the case of vacuum arc remelting, whereas casting into a rectangular cast product, that is, a slab is possible in the case of electron beam remelting.

When using such a large-sized cast product as the material to produce a titanium material such as a titanium thin sheet, the large-sized cast product is subjected to surface cutting mending as necessary, is then subjected to slabbing or forging in a hot condition, and is thereby made into slabs with a shape and dimensions suitable for subsequent hot rolling. The hot working step by slabbing or forging is herein referred to as a breakdown step. Then, generally it has been the case that, after the surface is subjected to cutting mending of cutting approximately several millimeters in order to remove an oxide layer or an oxygen-concentrated layer formed on the surface of the slab after the breakdown, the resulting piece is subjected to hot rolling.

However, in such a conventional common method, a great deal of time and cost are required for the breakdown step by slabbing or forging for fashioning from a large-sized cast product to a shape and dimensions suitable for hot rolling, and this has been a severe bottleneck to the improvement in productivity of titanium thin sheet production and cost reduction.

As a method for casting a slab-shaped cast product, recently a direct cast (DC) slab casting method (direct casting method) has been employed in which, in place of large-sized ingot casting like that described above, titanium molten metal melted in a hearth by electron beam remelting is continuously poured into a water-cooled copper mold kept in a vacuum atmosphere, the portion solidified in the water-cooled copper mold is continuously drawn out from the lower end side of the mold, and thus a slab-shaped cast product with a prescribed length is obtained. By the DC slab casting method, a technology of producing a relatively thin slab-shaped cast product, that is, a titanium cast product having a shape and dimensions that allow the piece to be subjected to hot rolling as it is being established.

When such a method of electron beam remelting and DC slab casting in a vacuum is employed, a breakdown step that has been needed can be omitted, and as a result it becomes possible to improve the productivity of titanium thin sheet production and reduce production cost. However, also in a slab obtained by DC slab casting in a vacuum, the surface layer of the cast product as it is has severe concavities and convexities and a large number of defects. If such a cast product is subjected to hot rolling as it is, the surface properties of the sheet after hot rolling (the hot rolled sheet) are deteriorated; thus, the fact of the matter is that, as in the case where a breakdown step starting from a large-sized ingot is used as described above, the resulting piece can be subjected to hot rolling only after cutting is performed on the surface. Therefore, the yield of the material is reduced, and the time and effort and cost for cutting are required; hence, the fact of the matter is that the demand for further improvement has been strong.

Further, even when a slab obtained by employing the method of electron beam remelting and DC slab casting in a vacuum in the manner described above (a breakdown step being omitted) is subjected to hot rolling after surface cutting is performed on the slab, there is a problem that the surface properties of the hot rolled sheet after hot rolling are not necessarily satisfactory. That is, there is a problem that a large number of large and small overlying flaws with lengths of approximately several millimeters to 10 mm occur on the surface of the hot rolled sheet. Such a large number of overlying flaws of the surface are herein referred to as surface defects. It is presumed that such surface defects of the hot rolled sheet are derived from a coarse cast structure of the cast slab. That is, it is presumed that the slab that has not undergone a breakdown step, which is hot working, has a cast structure formed of coarse crystal grains that is as cast; and even when cutting is performed on the surface, a coarse structure exists in the surface layer after cutting, and surface defects occur on the hot rolled sheet due to such a coarse surface cast structure.

Here, as a specific factor by which surface defects occur on the hot rolled sheet due to a coarse cast structure, it is presumed that concavities and convexities are formed on the surface by the influence of deformation anisotropy in grains and between crystal grains due to coarse crystal grains and, with the progress of subsequent hot rolling, metal lies over the concavities and becomes surface defects. Further, in a titanium alloy, the α phase (the grain boundary α phase) is created near the grain boundaries between prior β crystal grains during transformation. In an alloy system containing a large amount of an α-stabilizing element(s) such as Al or O, which is commonly used in titanium alloys, the hot deformation resistances of the α phase and the β phase are greatly different, and the difference may form a starting point of a crack during hot and cold working to be performed later.

For a titanium slab for hot rolling obtained without undergoing a breakdown step, several methods of performing modification treatment on the surface layer of the slab before hot rolling have already been proposed in order to prevent the occurrence of surface defects on the surface of the hot rolled sheet after hot rolling.

For example, Patent Literature 1 proposes a method in which the surface of a titanium slab for hot rolling is beaten with a steel tool having a tip shape with a curvature radius of 3 to 30 mm or a steel ball with a radius of 3 to 30 mm in a cold condition (subjected to plastic processing), and is thereby provided with dimples with an average height of the profile elements of undulation of 0.2 to 1.5 mm and an average length of the profile elements of undulation of 3 to 15 mm. In the proposed method, by providing the surface layer of the titanium slab with a prescribed plastic strain in a cold condition with a steel tool or a steel ball like that described above, the surface layer is recrystallized during subsequent hot rolling, and thus a fine structure is produced. Thereby, the occurrence of concavities due to a coarse structure like that described above can be prevented, and therefore the amount of surface defects of the hot rolled plate can be reduced even when a breakdown step is omitted.

Patent Literature 2 proposes a method in which high energy is applied to a surface of a titanium slab for hot rolling, particularly to a surface on the side serving as a rolling surface during hot rolling, by high-frequency induction heating, arc heating, plasma heating, electron beam heating, laser heating, and the like and thereby only the surface layer is melted to a depth of more than or equal to 1 mm, and immediately thereafter rapid cooling re-solidification is performed. In the case of performing the proposed method, since the melting point of titanium is naturally a temperature higher than or equal to the β transformation temperature, in association with the melting of the surface, also a heat-affected zone (HAZ) layer on the lower side (matrix side) of the molten layer of the surface is heated to higher than or equal to the β transformation temperature, and transform into β phase. In the proposed method, the surface is smoothed by the melting of the surface layer of the titanium slab for hot rolling, then the molten layer is rapidly cooled and solidified by heat removal from the matrix side, and at the same time the HAZ layer (the β phase) on the lower side is rapidly cooled; consequently, the molten layer and the HAZ layer become a fine transformed structure (usually, a fine acicular structure). The surface layer that has been made fine in this way is recrystallized in the early stage of subsequent hot rolling, and becomes a fine grainy structure with random orientations (an equiaxed grain structure). Therefore, it has been possible to some extent to prevent the occurrence of concavities due to a coarse structure and also eliminate the surface defects of the hot rolled sheet after hot rolling. However, in the invention disclosed in Patent Literature 2, there is a case where the surface defects of the hot rolled sheet cannot be prevented at a practical level, and the cause thereof is unclear; thus, the improvement therein has been desired.

CITATION LIST

Patent Literature

Patent Literature 1: WO 2010/090352
Patent Literature 2: JP 2007-332420A

SUMMARY OF INVENTION

Technical Problem

An issue of the present invention is to provide a titanium cast product for hot rolling that does not need surface layer modification treatment like that shown in Patent Literature 1 and has further improved the invention disclosed in Patent Literature 2, that is, omits a breakdown step and prevents the occurrence of surface defects on the surface of the hot rolled sheet after subsequent hot rolling at a practical level, and thereby makes it possible to improve the productivity of titanium hot rolled sheet production and achieve cost reduction, and a method for producing the same.

Solution to Problem

To solve the issue described above, extensive experiments and studies were conducted on the surface layer modification technology shown in Patent Literature 2 described above, and the following findings have been obtained.

That is, the cooling performed after the surface of a cast product is heated and only the surface layer is melted by a heating means with a high energy density such as an electron beam is usually performed by heat removal from the matrix side. At this time, as the thickness of the molten layer becomes thinner, the cooling rate immediately after heating becomes larger because the amount of heat input per unit area of the surface of the cast product (hereinafter, the unit area with respect to the amount of heat input refers to 1 cm$^2$) becomes smaller, and accordingly the cooled and solidified surface layer (the melted and re-solidified layer) becomes a finer structure and also the structure of the surface layer upon being subjected to subsequent heating for hot rolling is made finer; consequently, it becomes possible to reliably suppress the occurrence of concavities in the early stage of hot rolling and the occurrence of surface defects of the hot rolled sheet.

However, it has been found that, when the thickness of the molten layer is thin, the following problems arise.

(1) When the melting depth is shallow, defects such as voids and creases derived from casting that are present in locations at some depths from the surface may not disappear. That is, it has been experimentally found that, in order to make the structure of the surface layer sufficiently fine by the re-solidification after melting, it is necessary that the melting depth be set to approximately several millimeters, and a structure-modified layer of the melting depth+β-HAZ that includes a fine structure layer (a β-HAZ layer) that is formed below the molten portion by melting due to being heated to higher than or equal to the temperature of the β region and less than the melting point be formed with more than or equal to 5 mm. That is, it has been surmised that, when the melting depth is shallow, the voids do not disappear; hence, cracks occur with the voids as starting points during hot rolling, consequently concavities occur on the surface, and surface defects occur.

(2) Since the surface of the cast product is heated and only the surface layer is melted by applying high energy such as an electron beam while moving the electron beam in one direction, the melting depth is very shallow around the boundary between the irradiated portion and the matrix portion (in the edge portion of the molten beads). It has been found that, when a portion with a shallow melting depth is present, although the structure of the melting depth+β-HAZ is likely to be turned into fine grains, there is, other than the problem of (1), a problem that, with concavities resulting from a coarse cast structure existing below the structure-modified layer as starting points, cracks occur, and surface defects of the hot rolled sheet are caused. It has been found that this phenomenon can be prevented by forming the structure-modified layer of the melting depth+β-HAZ with more than or equal to 5 mm.

(3) On the other hand, it has been found that it takes a huge cost to completely modify the structure of the entire surface to be rolled of the cast product. However, it has also been found that the occurrence of some level of surface defects during hot rolling can be solved by performing the mending of the surface of the hot rolled sheet, and the advantage of the cost reduction of slabbing or forging can be sufficiently enjoyed.

On the other hand, it has also been found that, when the melting depth is set deep, the following problem arises.

When it is attempted to set the melting depth deep, it is necessary to melt the surface layer with a higher energy density. However, in this case, in contrast to the case described above, the amount of heat input per unit area is increased, and the cooling rate by heat removal from the matrix side immediately after heating is reduced. Hence, the structure of the cooled and solidified surface layer (the melted and re-solidified layer) is not made sufficiently fine, and the structure of the surface layer upon being subjected to subsequent heating for hot rolling is not made sufficiently fine either; consequently, the amounts of concavities occurring in the early stage of hot rolling and surface defects of the hot rolled sheet are not sufficiently reduced. It has been found that, to prevent this phenomenon, the structure-modified layer of the melting depth+β-HAZ needs to be suppressed to less than or equal to 9 mm.

The present inventors conducted extensive experiments and studied on the basis of such new findings; and have revealed the problems of the surface modification technology shown in Patent Literature 2, and have found that, by further improving the technology, the concavities occurring in the early stage of hot rolling and the surface defects of the hot rolled sheet can be sufficiently suppressed and have found that the concavities occurring in the early stage of hot rolling and the surface defects of the hot rolled sheet can be suppressed at a practical level.

That is, it has been found that the concavities occurring in the early stage of hot rolling and the surface defects of the hot rolled sheet can be reliably prevented at a practical level and the occurrence of surface defects on the hot rolled sheet after subsequent hot rolling can be reliably suppressed by, when melting the surface layer of the cast product serving as the material of a slab for hot rolling by electron beam irradiation and re-solidifying the surface layer, controlling the electron beam irradiation power and the irradiation conditions (the way of superimposing molten beads etc.) and thereby performing the melting of the surface of the slab for hot rolling so that the shape of the entire fine structure layer formed by electron beam irradiation is in a specific range; thus, the present invention has been completed.

The gist of the present invention is as follows.

(1)
A titanium cast product for hot rolling made of titanium, the titanium cast product for hot rolling comprising, on a surface serving as a rolling surface:
a fine structure layer made of grains finer than grains of a matrix layer, the fine structure layer being formed by melting and re-solidification,
wherein the fine structure layer has a thickness of more than or equal to 5 mm and less than 9 mm in depth, and
a proportion of crystal grains each having a grain size of more than or equal to 1 mm in a position at ½ of the average thickness of the fine structure layer is less than 15%.

(2)
The titanium cast product for hot rolling according to (1), wherein the titanium cast product for hot rolling is made of commercial pure titanium or a titanium alloy.

(3)
A method for producing the titanium cast product for hot rolling according to (1) or (2),
the method including:
an outer layer heating treatment step of heating a surface serving as a rolling surface of hot rolling of a cast product material made of titanium by electron beam irradiation and thereby heating an area more than or equal to 5 mm and less than 9 mm in depth from the surface to higher than or equal to β transformation temperature; and
a cooling step of, after the outer layer heating treatment step, performing cooling to a temperature lower than the β transformation temperature.

(4)
The method for producing the titanium cast product for hot rolling according to (3), wherein, in the outer layer heating treatment step, electron beam irradiation is performed while an electron beam irradiation gun is continuously moved in a direction parallel to the surface of the cast product material.

(5)
The method for producing the titanium cast product for hot rolling according to (3), wherein the cooling step is performed by heat removal from a matrix side of the cast product material.

(6)
The method for producing the titanium cast product for hot rolling according to (3), wherein the cast product material is a piece cast by a DC slab casting method.

(7)
The method for producing the titanium cast product for hot rolling according to (3), wherein the cast product material has an as-cast casting surface.

According to the present invention described above, the severe concavities and convexities that have been present in the casting surface after casting are eliminated by melting and are smoothed, at the same time the defects such as internal voids derived during casting have disappeared, and also the coarse cast structure has disappeared. In addition, the outermost surface has been made a fine structure layer formed by re-heating and rapid cooling. Therefore, when the titanium cast product for hot rolling of the present invention is subjected to hot rolling, the occurrence of surface defects due to creases and internal voids derived during casting can be prevented, and at the same time also the occurrence of concavities in the early stage of hot rolling and the occurrence of surface defects of the hot rolled sheet due to the insufficiency of fine structure can be reliably prevented.

That is, for the inside fine structure layer that has been melted and heated to higher than or equal to the β transformation temperature when being melted and re-solidified, the fine structure layer has a thickness in the range of more than or equal to 5 mm and less than 9 mm and has a sufficient thickness even between molten beads, and the voids that have been present in the place extending approximately several millimeters from near the surface have been sufficiently eliminated.

On the other hand, by not making melting too deep, the fine structure layer has become a layer formed of a sufficiently fine structure by virtue of the high-rate rapid cooling effect by heat removal from the matrix. Therefore, also the occurrence of concavities in the early stage of hot rolling and the occurrence of surface defects of the hot rolled sheet due to the insufficiency of fine structure can be reliably prevented.

The actions described above can be obtained even by a cast product in a state without undergoing a breakdown step such as slabbing or forging, which is hot working, after casting, and furthermore can be obtained even by an as-cast cast product of what is called black skin in which cutting is not performed on its surface in advance.

In the method for producing the titanium cast product for hot rolling of the present invention, the cast product material mentioned above may be a piece cast by the DC slab casting method, including a piece produced by a process in which a molten metal obtained by the electron beam remelting method is cast by the DC slab casting method, and may be a piece having an as-cast casting surface. Such a rectangular cast product is obtained without undergoing a breakdown step based on slabbing or forging; and the melting method is not particularly limited, but the electron beam remelting method, the plasma arc melting method, or the like may be employed. In the electron beam remelting method, since it is melting in a high vacuum, the interiors of the voids remaining near the slab surface become a vacuum after melting; thus, there is an advantage that the voids can be pressure-bonded during hot rolling, and can be made harmless easily. On the other hand, in the plasma arc melting method, since melting can be performed in a low vacuum atmosphere, there is an advantage that, when producing a titanium alloy, an alloy element with a high vapor pressure can be added easily; thus, an optimum melting method may be selected as appropriate in accordance with the component system to be melted.

Advantageous Effects of Invention

In the titanium cast product for hot rolling according to the present invention, the surface is flat, there are few minute voids in the interior immediately below the surface, and the outermost surface is a significantly fine structure. Therefore, when the titanium cast product is subjected to hot rolling, the occurrence of concavities on the surface in the early stage of hot rolling and the occurrence of surface defects on the hot rolled sheet can be stably prevented at a practical level. Such effects can be obtained even when a cast product that has not undergone a breakdown step such as slabbing or forging is used as the cast product of the material for producing a titanium cast product for hot rolling. Therefore, it becomes possible to omit a breakdown step, and it becomes possible to achieve a significantly lower cost than in the past.

DESCRIPTION OF EMBODIMENTS

Hereinbelow, embodiments of the present invention are described in detail with reference to the drawings.

Figure 1:
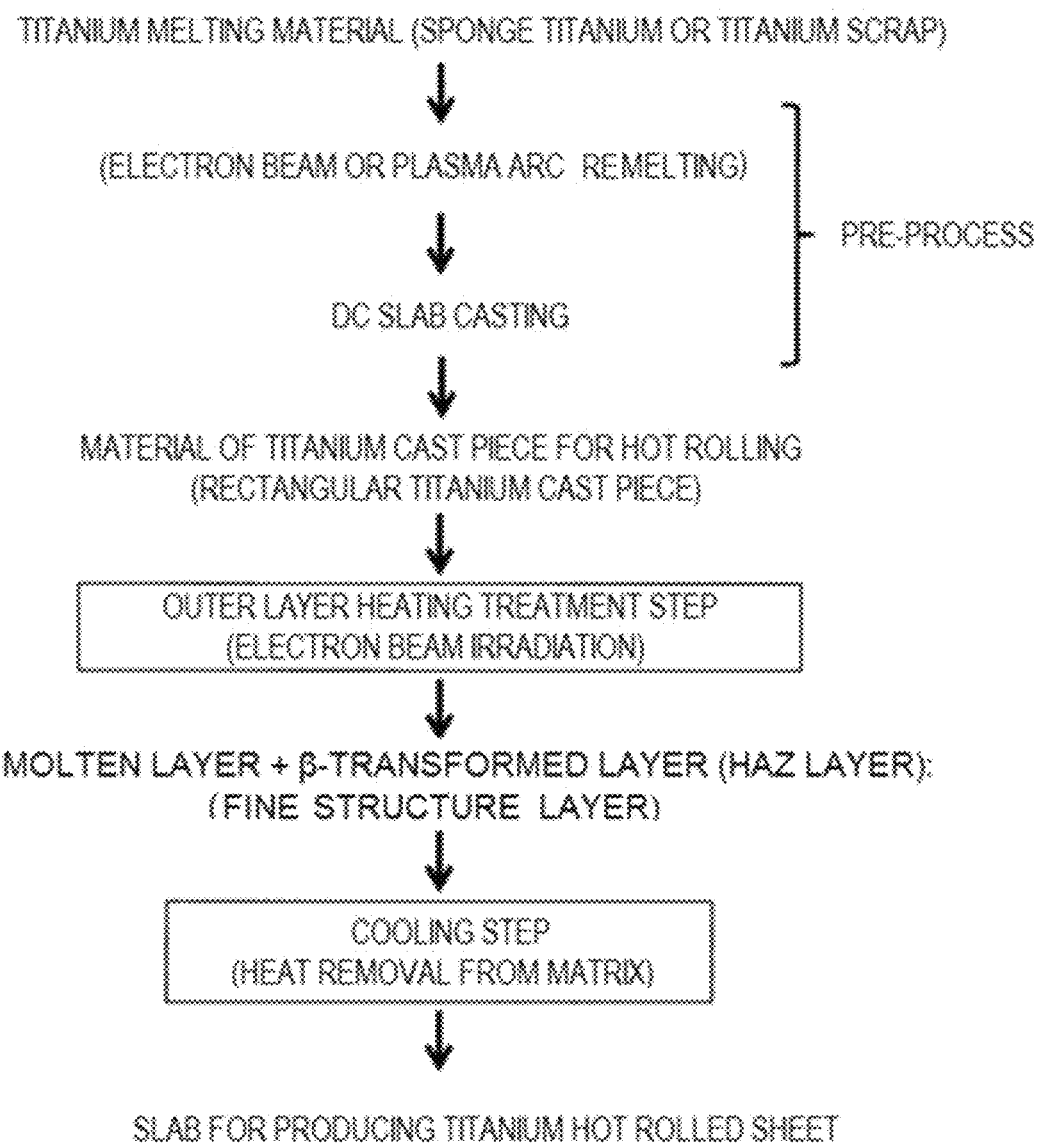
FIG. 1 is a schematic diagram showing a flow of an embodiment of a method for producing a titanium cast product for hot rolling of the present invention.
Figure 2:
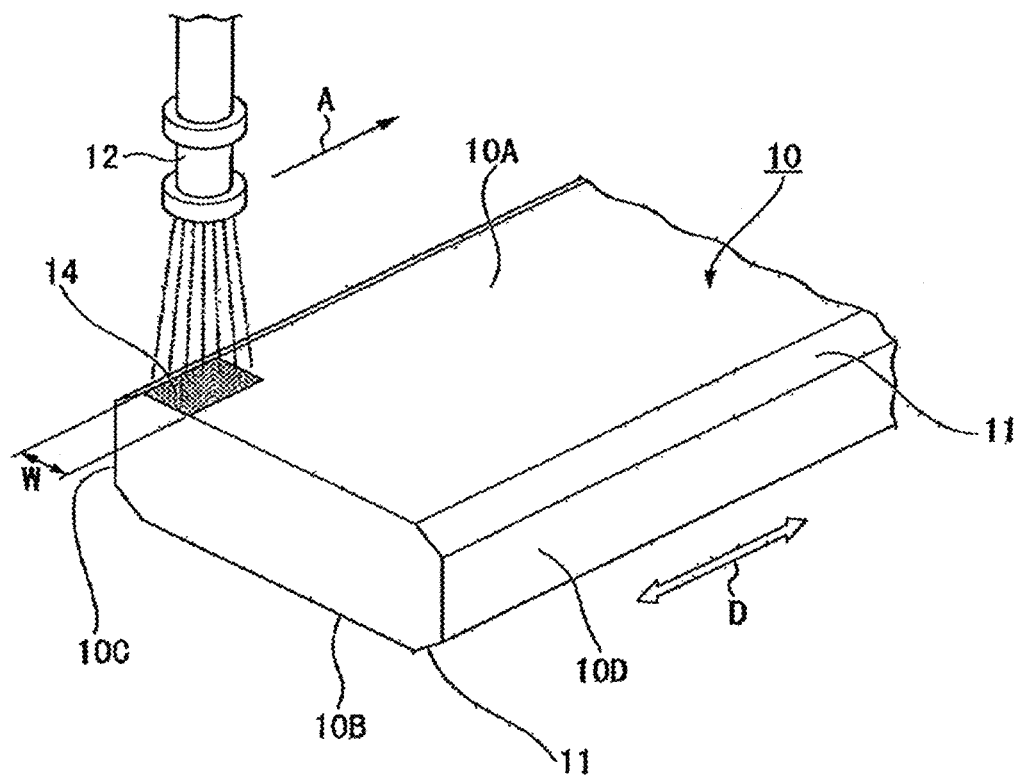
FIG. 2 is a schematic perspective view showing an overview of an example of a material (the rectangular titanium cast product) used in an embodiment of the method for producing a titanium cast product for hot rolling of the present invention and a situation of electron beam irradiation to the material.
Figure 3:
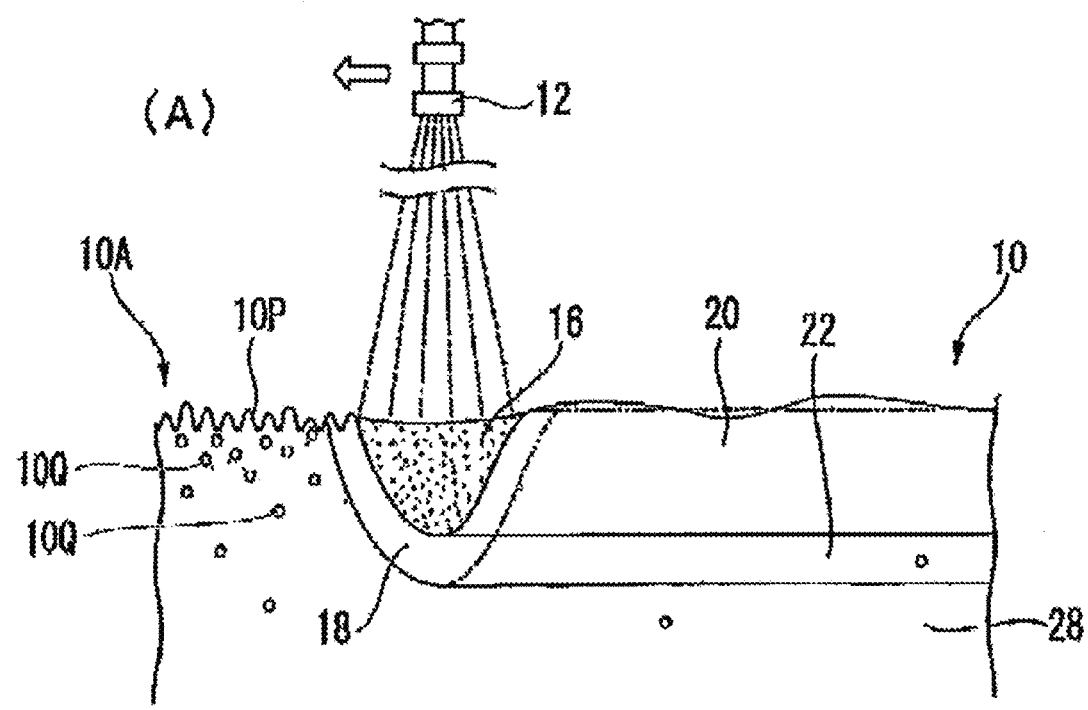
FIG. 3 is a schematic cross-sectional view showing step-by-step an example of change of a surface layer of the rectangular titanium cast product of the material in an embodiment of the method for producing a titanium cast product for hot rolling of the present invention.

FIG. 1 schematically shows the steps of an overall process in a method for producing a titanium cast product for hot rolling according to an embodiment of the present invention. In FIG. 1, also an example of the production process of a rectangular titanium cast product serving as a material is shown as a pre-process. FIG. 2 shows an overview of a material (a rectangular titanium cast product) used in an embodiment of the method for producing a titanium cast product for hot rolling of the present invention, and at the same time shows a situation of electron beam irradiation to the rectangular titanium cast product. FIG. 3 shows change of a cross-sectional condition around a surface of the rectangular titanium cast product provided by the steps in the embodiment of the production method shown in FIG. 1.

[Pre-Process]

When producing a titanium cast product for hot rolling of the present invention, as shown in FIG. 1 as a pre-process, a prescribed amount of a melting material of a commercial pure titanium, such as titanium sponge obtained by the Kroll method or titanium scrap, or a master alloy serving as a source material of a titanium alloy and made of a compound of titanium and one or more additive elements, is melted in a hearth by electron beam remelting. The resulting titanium molten metal is continuously poured into a water-cooled copper mold for DC slab casting, that is, a water-cooled copper mold in which the top and bottom are opened and the horizontal cross section is in a rectangular shape (including the case where a chamfer is formed in a corner portion). Then, the cast product solidified in the mold is continuously drawn out downward; thereby, a rectangular (slab-shaped) titanium cast product that has an as-cast shape and as-cast dimensions and has a thickness, width, and length suitable for hot rolling is obtained. Likewise, also the case where a chamfer is provided in a corner portion of the cast product is widely referred to as "rectangular." The atmosphere at the time of the melting in a hearth by electron beam heating and the casting mentioned above is kept in a vacuum.

Here, the commercial pure titanium includes commercial pure titanium provided by class 1 to class 4 of the JIS standard, and their corresponding commercial pure titanium provided by Grades 1 to 4 of the ASTM standard and 3.7025 of the DIN standard. That is, it can be said that the commercial pure titanium dealt with in the present invention is a commercial pure titanium consisting of, in mass %, C: less than or equal to 0.1%, H: less than or equal to 0.015%, O: less than or equal to 0.4%, N: less than or equal to 0.07%, Fe: less than or equal to 0.5%, and the balance: Ti. In addition, also high corrosion-resistant alloys called modified (improved) pure titanium in which some amounts of one or more platinum group elements are added to the above materials (ASTM Grades 7, 11, 16, 26, 13, 30, and 33 or their corresponding classes of JIS, and titanium materials in which small amounts of various elements are further contained) are dealt with as materials included in the commercial pure titanium in the present invention.

A titanium alloy is usually molded into a sheet material by hot rolling and/or cold rolling, and is also produced as products in the forms of a wire material, a bar material, etc. Here, as the titanium alloy, an α titanium alloy, an α+β titanium alloy, or a β titanium alloy may be used. Thus, in the present invention, the composition of the titanium alloy is not particularly limited.

When producing the titanium cast product for hot rolling of the present invention, the rectangular titanium cast product serving as the material may be basically one obtained by an arbitrary melting method and an arbitrary casting method. A titanium cast product that can exhibit the effect of the present invention most effectively is a titanium cast product obtained by melting a source material such as titanium sponge or titanium scrap in a vacuum by the electron beam remelting method or the plasma arc melting method and casting the titanium molten metal in a vacuum by the DC slab casting method into a rectangular shape with a long rectangular cross section (a slab shape). By such a DC slab casting method, a rectangular titanium cast product having a rectangular cross section with a shape and dimensions suitable for hot rolling can be easily obtained, and therefore a hot breakdown step such as slabbing or forging can be omitted.

The dimensions of the rectangular titanium cast product are not particularly limited to the extent that they are dimensions that can be used in hot rolling as they are. When coil rolling is used as the hot rolling to produce a hot rolled coil medium-thin sheet with a sheet thickness of approximately 3 mm to 8 mm, the dimensions of the rectangular titanium cast product may be set to a thickness of approximately 150 mm to 280 mm, a length of approximately 3 m to 10 m, and a width of approximately 600 mm to 1500 mm.

Also in a billet, a bloom, etc. to be subjected to hot rolling, similar effects are exhibited by performing heat treatment and hot rolling on the portion corresponding to the rolling surface in the manner of the present invention. The titanium cast product serving as the material is not limited to a rectangular shape (a slab shape), and includes also a billet and a bloom.

The rectangular titanium cast product obtained by DC slab casting in the manner described above is subjected to, as it is, an outer layer heating treatment step and a cooling step in this order as shown in FIG. 1. Here, "the rectangular titanium cast product is subjected to the steps as it is" means that the piece is, as the material for producing a slab for producing a titanium hot rolled sheet, subjected to the steps in the state of an as-cast material without undergoing a breakdown step by hot working such as slabbing or forging. Therefore, usually the rectangular titanium cast product serving as the material of the titanium cast product for hot rolling has, as a surface property, coarse concavities and convexities derived from casting, at the same time has a coarse cast structure, and has a large number of defects such as voids derived from casting in the portion extending approximately several millimeters in depth from the surface portion. Also a method in which the surface is melted after undergoing a cutting step for the mending of the slab surface is acceptable, as a matter of course, and this makes it easy to provide a smoother surface.

The steps described below are performed on, out of the four surfaces excluding the front end surface (the lower end surface corresponding to the casting start surface) and the rear end surface (the upper end surface corresponding to the casting finish surface) at the time of DC slab casting out of the outer surfaces of the rectangular titanium cast product, at least the two surfaces (that is, the two surfaces with a wide width) serving as the rolling surfaces (the surfaces to be in contact with hot rolling rolls) in the hot rolling step. In the case of a rectangular cast product having a chamfer, the chamfer surface forms a part of the two surfaces with a wide width mentioned above.

Specifically, for example as shown in FIG. 2, in a rectangular titanium cast product 10 having chamfers 11, out of the four surfaces 10A to 10D lying along the casting direction (the direction in which the cast product is drawn out in DC slab casting) D, the two surfaces 10A and 10B with a wide width (the surface including the chamfer 11) serve as the rolling surfaces during hot rolling. Thus, the steps are performed on at least the two surfaces 10A and 10B with a wide width including the chamfer 11.

Further, the steps may be performed also on, out of the four surfaces 10A to 10D lying along the casting direction D, the two surfaces with a narrow width (the surfaces serving as the edge sides during hot rolling) 10C and 10D, as well as the two surfaces with a wide width (the surfaces serving as the rolling surfaces during hot rolling) 10A and 10B. The steps for the two surfaces 10C and 10D on the edge side in this case may be performed on another occasion after the steps for the two surfaces 10A and 10B with a wide width serving as the hot rolling surfaces are finished. In the embodiment, the steps for the two surfaces 10C and 10D on the edge side are omitted for simplification of description.

[Outer Layer Heating Treatment Step] to [Cooling Step]

The rectangular titanium cast product obtained by electron beam remelting and DC slab casting in the above manner is subjected to an outer layer heating treatment step as it is. The outer layer heating treatment step is, as shown in FIG. 2, a step in which, out of the outer surfaces of the rectangular titanium cast product 10, at least the two surfaces 10A and 10B with a wide width serving as the rolling surfaces in the hot rolling step (the surfaces to be in contact with hot rolling rolls) are irradiated with an electron beam, and only the surface layers of the surfaces are melted. Herein, the step is first performed on one surface 10A out of the two surfaces 10A and 10B.

Here, as shown in FIG. 2, the area of an irradiation area 14 of the surface 10A of the rectangular cast product 10 that is irradiated with an electron beam by one electron beam irradiation gun 12 is usually much smaller than the total area of the surface 10A to be irradiated; thus, in practice, usually the entire surface 10A to be irradiated is irradiated with an electron beam while the electron beam irradiation gun 12 is continuously moved or the rectangular cast product 10 is continuously moved. The shape and area of the irradiation area can be adjusted by adjusting the focus of the electron beam, or by using an electromagnetic lens to oscillate a small beam at a high frequency to form a beam flux. The following description of the embodiment is advanced on the assumption that the electron beam irradiation gun 12 is continuously moved as indicated by an arrow A in FIG. 2. The direction of movement of the electron beam irradiation gun is not particularly limited; but in general it is continuously moved along the length direction (usually the casting direction D) or the width direction (usually a direction perpendicular to the casting direction D) of the rectangular cast product 10, and thereby irradiation is continuously performed in a band shape with the width W (in the case of a circular beam or a beam flux, the diameter W) of the irradiation area 14 mentioned above. Further, a not-irradiated band-shaped area adjacent to the irradiated area is irradiated with an electron beam in a band shape while the irradiation gun 12 is continuously moved in the opposite direction (or the same direction). Depending on the circumstances, a plurality of irradiation guns may be used to irradiate a plurality of areas with electron beams simultaneously. In FIG. 2, a case where a rectangular beam is continuously moved along the length direction (usually the casting direction D) of the rectangular cast product 10 is shown.

When the surface of the rectangular titanium cast product 10 (the surface 10A) is irradiated with an electron beam by such an outer layer heating treatment step and thereby the surface is heated to a temperature higher than or equal to the melting point of titanium (usually approximately 1670° C.), as shown on the left-of-center side of FIG. 3, the surface layer of the surface 10A of the rectangular titanium cast product 10 is melted at the maximum to the depth in accordance with the amount of heat input. However, as shown in FIG. 4(a), the depth from a direction perpendicular to the direction of electron beam irradiation is not uniform;

and a downward convex warped shape in which a central portion of electron beam irradiation is deepest and the thickness decreases toward the edge portion of the band shape is created. Also in an area on the inside of the cast product with respect to the molten layer 16, the temperature is increased due to the heat effect by electron beam irradiation, and the portion that has reached a temperature higher than or equal to the β transformation temperature of pure titanium (the heat-affected layer, the HAZ layer) is transformed to the β phase. Also the area transformed to the β phase by the heat effect by electron beam irradiation in the outer layer heating treatment step in this way becomes a downward convex warped shape similarly to the shape of the molten layer 16.

Figure 4:
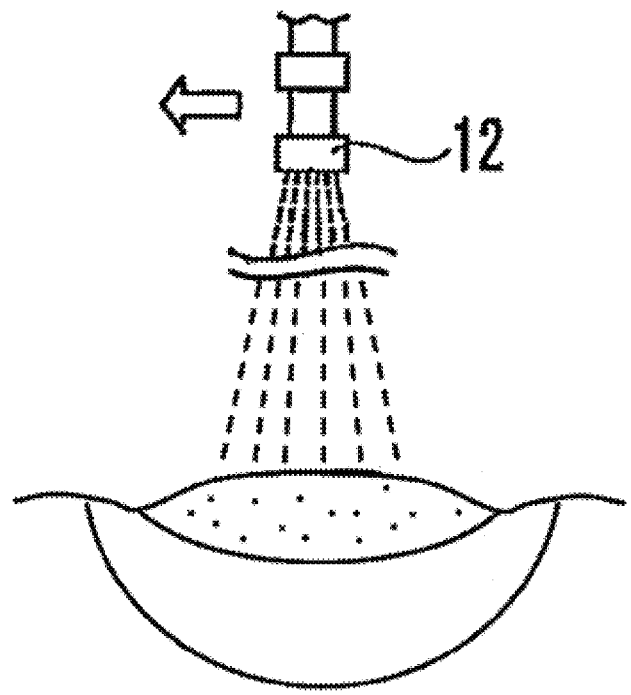
FIG. 4 is a schematic diagram showing an example of a cross-sectional structure taken along a direction perpendicular to a direction of electron beam irradiation around a surface of the titanium cast product for hot rolling of the present invention.
Figure 4:
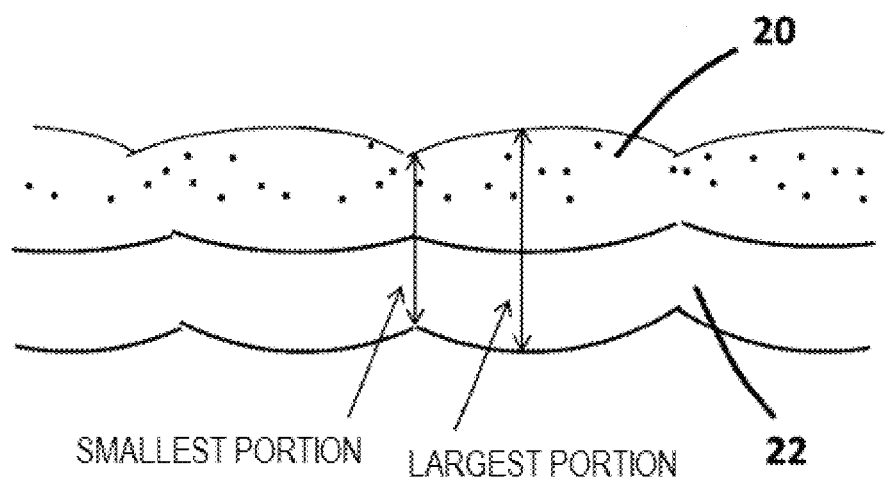

If the melting depth becomes shallower toward the edge portion of the band shape like this, the voids present in the place extending several millimeters from the outer layer cannot be eliminated; hence, cracks occur with the voids as starting points during hot rolling, consequently concavities occur on the surface, and surface defects occur. Furthermore, due to the melting depth being shallow, the effect of the underlying coarse cast structure works, and this causes the occurrence of surface defects during hot rolling. Thus, it is necessary to, when irradiating the adjacent not-irradiated band-shaped area, make appropriate the way of superimposing the electron beam with the already irradiated area. The superimposition of the electron beam is performed by, when irradiating the adjacent not-irradiated portion in the opposite direction to (or in the same direction as) the shape of the molten portion or the band-shaped area, continuously moving the irradiation gun and applying the electron beam in a band shape while shifting the center position of the electron beam by a necessary amount. The amount of superimposition is expressed as the distance between the adjacent band-shaped portion and the electron beam, and is preferably set to more than or equal to 5 mm and less than 20 mm. If the amount of superimposition is smaller than 5 mm, the shape of the molten portion is made smoother and melting is made to a sufficient depth even in the edge portion of the band shape, and therefore the voids can be removed; but when the adjacent untreated portion is melted, most of the already irradiated part is increased to a high temperature due to the heat effect. Consequently, the fine structure formed by melting and re-solidification treatment becomes coarse, and the amount of crystal grains whose sizes are more than or equal to 1 mm becomes large. On the other hand, if the amount of superimposition is set to more than or equal to 20 mm, the volume of superimposition is small, and the voids in the edge portion of the band shape are not sufficiently removed but are remained. By setting the amount of superimposition to more than or equal to 5 mm and less than 20 mm, as shown in FIG. 4(*b*), a sufficient melting depth can be ensured and the voids can be removed even in the edge portion of the band shape (the smallest portion). However, if the melting depth is made too deep, the cooling rate by heat removal from the matrix is reduced, and sufficient fine-making of the structure to be described later cannot be made. By the total depth of the molten layer 16 and the β-transformed layer 18 obtained by the outer layer heating treatment step being in the range of more than or equal to 5 mm and less than 9 mm in a direction perpendicular to the direction of electron beam irradiation, both the elimination of the voids in the edge portion of the band shape and the suppression of the structure of the central portion of the band shape becoming coarse can be achieved. The thickness (depth) of the molten layer 16 is not particularly limited. It is sufficient that the total depth of the molten layer 16 and the β-transformed layer 18 be the depth mentioned above, and it is usually preferable that the molten layer 16 be in the range of 2 to 3 mm.

Since the melting depth obtained by electron beam irradiation is mainly associated with the amount of heat input, the electron beam irradiation conditions are selected so as to obtain an amount of heat input that yields the melting depth mentioned above. Since in practice the necessary amount of heat input varies with the thickness (heat capacity) of the cast product, the temperature of the matrix, the cooling conditions of the matrix side, etc., the amount of heat input to obtain the melting thickness mentioned above cannot be determined arbitrarily; but usually the amount of heat input per unit area (per 1 cm$^2$) may be set to approximately 30 to 150 J. Here, as the electron beam irradiation conditions that influence the amount of heat input per unit area, the power and beam diameter of the irradiation gun, the speed of movement of the gun (the speed of movement of the irradiation position) in the case of performing irradiation while continuously moving the irradiation gun as described above, etc. are given; and these may be appropriately set to ensure the amount of heat input mentioned above.

Although not particularly illustrated, when irradiating the surface of the rectangular titanium cast product with an electron beam to perform the outer layer heating treatment step and then performing a cooling step, the rectangular titanium cast product is mounted on a water-cooled base made of a thermally conductive material (metal), such as stainless steel, copper, or aluminum, to prevent an overall temperature of the rectangular titanium cast product from increasing due to electron beam irradiation. Then, immediately after the outer layer heating treatment step is performed, heat removal from the matrix side is caused to proceed rapidly and thereby the cooling step is performed. Thus, the effect of the present invention can be further enhanced.

In a process from the outer layer heating treatment step to the cooling step like that described above, the surface of the rectangular titanium cast product melted by electron beam irradiation is made flat due to the surface tension, and the coarse concavities and convexities of the casting surface are eliminated. Also the voids derived from casting that have been present in the surface disappear due to the melting of the surface. Therefore, the melted and re-solidified layer obtained by cooling and solidifying the molten layer becomes a layer with few surface concavities and convexities and few voids of the interior. Furthermore, the coarse cast structure disappears due to melting, and a fine structure is produced by the solidification in the subsequent cooling step and further by the transformation from the β phase to the α phase. The cooling and solidification are performed by heat removal from the matrix side, and the cooling rate by heat removal from the matrix side is considerably large; therefore, the structure after solidification and transformation is made fine.

The β-transformed layer is heated to a temperature higher than the β transformation temperature, is then cooled at a large cooling rate by heat removal from the matrix side to be reversely transformed to the α phase, and becomes a HAZ layer. Accordingly, also the HAZ layer is made a fine structure.

However, the molten layer+the HAZ layer mentioned above may not be uniformly formed in the entire surface of the melted and re-solidified cast product, and a coarse structure may remain partly. Also in this case, when the proportion of crystal grains having sizes of more than or equal to 1 mm in a portion at ½ of the average thickness of the molten layer+the HAZ layer is less than 15%, the amount of any possible surface defects occurring after hot rolling is very small, and is at a level that can be fully coped with by surface mending.

Here, the proportion of crystal grains having sizes of more than or equal to 1 mm is the proportion of the number in a portion at ½ of the average thickness of the molten layer+the HAZ layer. Thus, the proportion can be measured by, after performing modification treatment, observing a cross section with an optical microscope to measure the grain size and the number of crystal grains in a portion at ½ of the average thickness of the molten layer+the HAZ layer.

The reason why the coarse structure mentioned above remains is unclear, but can be surmised as follows.

The size of the structure formed in the melted and re-solidified layer is determined by the heat input of the molten portion and the heat removal from the matrix. Since a large number of concavities and convexities such as creases are present in the outer layer of the as-cast slab, when the outer layer portion having such concavities and convexities is melted, the condition of heat removal from the slab varies, and parts having relatively coarse crystal grains occur depending on the circumstances. Furthermore, a once melted part may, during the melting of another part, increase to a high temperature range of not more than the β transformation temperature due to the heat effect from the other part. Consequently, the relatively coarse crystal grains may further make grain growth and form coarse crystal grains having sizes of more than or equal to 1 mm.

Figure 5:
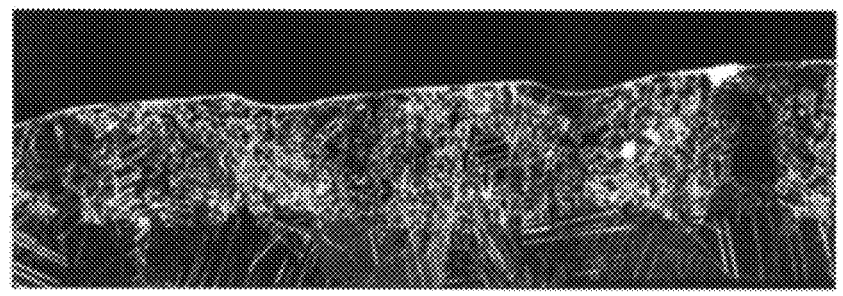
FIG. 5 is a cross-sectional observation photograph showing a fine structure layer and a cast and solidified structure in an outer layer portion of the titanium cast product for hot rolling of the present invention.

In FIG. 5, a cross-sectional observation photograph showing a fine structure layer, an inside fine structure layer, and a cast and solidified structure in the outer layer portion of a titanium cast product for hot rolling obtained in the above manner, that is, a titanium cast product for hot rolling obtained by performing modification treatment on a rectangular titanium cast product is shown.

When actually using the thus obtained titanium cast product for hot rolling, the piece is hot rolled into a hot rolled sheet with a desired sheet thickness. The type of hot rolling is not particularly limited; but when it is attempted to produce a thin-sheet hot rolled sheet product, usually coil rolling is used. The sheet thickness after hot rolling in this case is not particularly limited, but is usually approximately 3 mm to 8 mm. The hot rolling conditions are not particularly limited; but like in ordinary titanium hot rolling, heating may be performed to 720° C. to 920° C. in the case of a commercial pure titanium and to immediately below the β transformation temperature in the case of an α or α+β titanium alloy for approximately 60 minutes to 420 minutes, hot rolling may be started at a temperature in the respective ranges, and the hot rolling may be finished at a temperature higher than or equal to room temperature in accordance with the performance of the rolling mill.

In the above embodiment, the rectangular titanium cast product obtained by electron beam remelting and DC slab casting is, as the material for producing a titanium cast product for hot rolling, subjected to the steps as it is, that is, in the state of an as-cast material without undergoing a breakdown step by hot working such as slabbing or forging. That is, a material having an as-cast casting surface (a casting surface formed of a surface in what is called a black skin state in which severe concavities and convexities derived from casting are present on the surface and a large number of casting defects such as voids are present in the outer layer portion) is used. The effect of the present invention can be exhibited most effectively when the present invention is applied to such an as-cast cast product; but the present invention may be applied also to, depending on the circumstances, a case where a layer extending approximately several millimeters from the outermost surface is removed by cutting in order to remove the concavities and convexities of the casting surface and the voids near the surface, that is, to a cast product in a state where what is called white skin has appeared. Furthermore, the present invention may be applied also to a cast product of what is called semi-white skin in which the whole or part of an oxygen-enriched layer (the maximum thickness being approximately 1 mm) that is produced on the surface because, upon opening the melting furnace or the cooled reactor after casting, the cast product has been taken out into the air at a high temperature, is removed by cutting.

EXAMPLES

Hereinbelow, Examples of the present invention are described based on experiments of test numbers 1 to 7 shown in Table 1 (Table 1A and Table 1B), test numbers 8 to 21 shown in Table 2 (Table 2A and Table 2B), and test numbers 22 to 24 shown in Table 3 (Table 3A and Table 3B), along with Reference Example based on the conventional method (that is, a slab obtained by slabbing) and Comparative Examples (Comparative Example in which the treatment of the present invention is not performed at all and Comparative Examples in which a treatment with conditions deviated from the conditions of the present invention is performed).

TABLE 1

A

| | Outer layer heating treatment | | | | |
|---|---|---|---|---|---|
| Test No. | Dimension of rectangular EB beam (cm) | Power (kW) | Application rate (cm/s) | Amount of heat input per 1 cm² (J) | Distance between adjacent band-shaped portion and electron beam |
| 1 | 1 | 15 | 150 | 100 | 7 |
| 2 | 1.5 | 15 | 150 | 67 | 10 |
| 3 | 1.5 | 20 | 200 | 67 | 10 |
| 4 | 3 | 22 | 100 | 73 | 15 |
| 5 | 2 | 22 | 100 | 110 | 10 |
| 6 | 2.5 | 25 | 60 | 167 | 15 |
| 7 | 2 | 20 | 150 | 67 | 22 |

TABLE 1-continued

| | Thickness of fine structure layer | | Proportion of crystal grains each having sizes of more than or equal to 1 mm (%) | Result of surface defects after pickling hot rolled sheet (Number per 1 m$^2$) | Notes |
|---|---|---|---|---|---|
| Test No. | largest portion | smallest portion | | | |
| 1 | 7.5 | 6.8 | 1 | 0.1 | Example: basic |
| 2 | 6.9 | 5.9 | 2 | 0.1 | Example: basic |
| 3 | 7.1 | 5.9 | 1 | 0.1 | Example: basic |
| 4 | 7.4 | 5.3 | 3 | 0.25 | Example: The difference between the largest and smallest portions is large. The result is satisfactory, but the number of surface defects tends to increase. |
| 5 | 8.2 | 7.2 | 7 | 0.25 | Example: The amount of heat input is relatively high. The result is satisfactory, but the number of surface defects tends to increase. |
| 6 | 10.5 | 8.9 | 17 | 0.7 | Comparative Example: The amount of heat input is too large. Since the fine structure layer is too thick, the result of the surface defects is assessed as failed. |
| 7 | 6.2 | 3.0 | 7 | 0.55 | Comparative Example: The interval of irradiation is large. The thickness difference of the fine structure layer is large, and surface defects is assessed as failed. |

TABLE 2

| | Outer layer heating treatment of first stage | | | | |
|---|---|---|---|---|---|
| Test No. | Dimension of rectangular EB beam (cm) | Power (kW) | Application rate (cm/s) | Amount of heat input per 1 cm$^2$ (J) | Distance between adjacent band-shaped portion and electron beam |
| 8 | 1 | 15 | 150 | 100 | 7 |
| 9 | 1.5 | 15 | 125 | 80 | 7 |
| 10 | 1 | 15 | 150 | 100 | 7 |
| 11 | 1.5 | 15 | 125 | 80 | 10 |
| 12 | 1 | 15 | 150 | 100 | 10 |
| 13 | 2 | 20 | 100 | 100 | 10 |
| 14 | 2 | 20 | 100 | 100 | 10 |
| 15 | 2 | 20 | 100 | 100 | 10 |
| 16 | 2 | 20 | 100 | 100 | 10 |
| 17 | 2 | 15 | 100 | 75 | 10 |
| 18 | 1 | 15 | 100 | 150 | 7 |
| 19 | 1.5 | 15 | 100 | 100 | 7 |
| 20 | 2 | 20 | 100 | 100 | 10 |
| 21 | 1.5 | 20 | 150 | 89 | 10 |

| | Thickness of fine structure layer | | Proportion of crystal grains each having sizes of more than or equal to 1 mm (%) | Result of surface defects after pickling hot rolled sheet (Number per 1 m$^2$) | Notes |
|---|---|---|---|---|---|
| Test No. | largest portion | smallest portion | | | |
| 8 | 7.5 | 6.8 | 5 | 0.12 | JIS class 2 |
| 9 | 6.7 | 6.0 | 3 | 0.10 | JIS class 3 |
| 10 | 7.5 | 6.8 | 3 | 0.11 | JIS class 4 |
| 11 | 6.7 | 6.0 | 2 | 0.11 | Ti—0.06Pd (ASTM Gr.17) |

TABLE 2-continued

| | | | | | |
|---|---|---|---|---|---|
| 12 | 7.5 | 6.8 | 1 | 0.09 | Ti—0.5Ni—0.05Ru (ASTM Gr.13) |
| 13 | 7.4 | 6.0 | 0.8 | 0.21 | Ti—1Fe—0.35O |
| 14 | 7.3 | 6.0 | 0.5 | 0.22 | Ti—5Al—1Fe |
| 15 | 7.5 | 6.0 | 0.3 | 0.18 | Ti—5Al—1Fe—0.25Si |
| 16 | 7.4 | 6.0 | 0.7 | 0.20 | Ti—3Al—2.5V |
| 17 | 7.5 | 6.0 | 0.3 | 0.20 | Ti—4.5Al—2Mo—1.6V—0.5Fe—0.3Si—0.03C (ASTM Gr.35) |
| 18 | 7.0 | 5.0 | 0.5 | 0.22 | Ti—4.5Al—2Fe—2Mo—3V |
| 19 | 6.9 | 5.7 | 2 | 0.22 | Ti—1Cu |
| 20 | 7.5 | 6.8 | 3 | 0.25 | Ti—1Cu—0.5Nb |
| 21 | 6.7 | 6.0 | 2 | 0.23 | Ti—1Cu—1Sn—0.3Si—0.2Nb |

TABLE 3

A

Outer layer heating treatment of first stage

| Test No. | Dimension of rectangular EB beam (cm) | Power (kW) | Application rate (cm/s) | Amount of heat input per 1 cm² (J) | Distance between adjacent band-shaped portion and electron beam |
|---|---|---|---|---|---|
| 22 | 1.5 | 20 | 150 | 89 | 10 |
| 23 | 1 | 15 | 150 | 100 | 10 |
| 24 | 1 | 15 | 150 | 100 | 10 |

B

| Test No. | Thickness of fine structure layer largest portion | Thickness of fine structure layer smallest portion | Proportion of crystal grains each having sizes of more than or equal to 1 mm (%) | Result of surface defects after pickling hot rolled sheet (Number per 1 m²) | Notes |
|---|---|---|---|---|---|
| 22 | 7.0 | 6.0 | 3 | 0.18 | Example |
| 23 | 7.3 | 6.2 | 8 | 0.25 | Example |
| 24 | 7.5 | 5.8 | 5 | 0.22 | Example |

<Test Numbers 1 to 7 (Table 1A and Table 1B)>

JIS class 1 pure titanium was subjected to DC casting by electron beam remelting to produce DC slabs of JIS class 1 pure titanium, each with a cross section of 1220 mm wide×270 mm thick and a length of 7000 mm, and a step of moving the slab back and forth to irradiate it with an electron beam in the longitudinal direction was repeated to perform electron beam irradiation on the entire rolling surfaces. Irradiation was performed also on the side surfaces of the slab.

Each of these slabs was inserted into a furnace at 820° C. and was then heated for approximately 240 minutes, the resulting piece was processed by a continuous hot rolling strip mill to produce a hot rolled sheet coil with a thickness of 5 mm, the sheet was passed through a continuous pickling line of nitrohydrofluoric acid, and the resulting piece was melted off approximately 50 μm per surface. After that, both sheet surfaces were visually observed to measure the number of surface defects. The number of surface defects that occurred in a 1 m square frame was observed by 10 to 15 visual fields, and the average was taken as the number of surface defects. When the sheet or the length did not reach 1 m, conversion was made so that the surface area of the observed hot rolled sheet became 1 m², and the resulting value was taken as the number of surface defects per 1 m².

Here, as the assessment criterion of the surface defects of the hot rolled sheet, the case where the number of surface defects was less than or equal to 0.3 per 1 m² was assessed as passed, and the case where it was more than 0.3 per 1 m² was assessed as failed. The assessment criterion applies also to test numbers 8 to 22 described later.

Test numbers 1, 2, 3, 4, and 5 are Examples of the present invention; and as shown in Table 1A and Table 1B, each of them had the form of the outer layer portion prescribed in the present invention (the difference between the maximum and minimum thicknesses of the fine structure layer), exhibited a structure with the crystal grain size prescribed in the present invention after heat treatment equivalent to hot rolling heating, and had few surface defects after hot rolling and exceeded the passing grade.

On the other hand, test numbers 6 and 7 are Comparative Examples that do not satisfy all of the form of the outer layer portion and the processing conditions prescribed in the present invention; they had many surface defects after hot rolling as shown in Table 1A and Table 1B, and the surface condition of the hot rolled sheet was assessed as failed.

<Test Numbers 8 to 21 (Table 2A and Table 2B)>

For test numbers 8 to 12, pure titanium of JIS class 1 was subjected to DC casting by electron beam remelting to produce DC slabs of commercial pure titanium or modified pure titanium (low alloy titanium) of various JIS grades or ASTM grades, each with a cross section of 1220 mm wide×270 mm thick and a length of 7000 mm, and a step of moving the slab back and forth to irradiate it with an electron beam in the longitudinal direction was repeated to perform electron beam irradiation on the entire rolling surfaces. Irradiation was performed also on the side surfaces of the slab.

For test numbers 13 to 18, DC slabs of titanium alloys each with a cross section of 950 mm wide×220 mm thick and a length of 5000 mm were produced by DC casting by electron beam remelting, and a step of moving the slab back and forth to irradiate it with an electron beam in the longitudinal direction was repeated to perform electron beam irradiation on the entire rolling surfaces. Irradiation was performed also on the side surfaces of the slab.

For test numbers 19 to 21, DC slabs of titanium alloys each with a cross section of 950 mm wide×250 mm thick and a length of 4500 mm were produced by DC casting by plasma arc melting, and a step of moving the slab back and forth to irradiate it with an electron beam in the longitudinal direction was repeated to perform electron beam irradiation on the entire rolling surfaces. Irradiation was performed also on the side surfaces of the slab.

Test number 8 is JIS class 2 pure titanium, test number 9 is JIS class 3 pure titanium, test number 10 is JIS class 4 pure titanium, test number 11 is a titanium alloy of ASTM Gr. 17, and test number 12 is a titanium alloy of ASTM Gr. 13. Test numbers 11 and 12 are each a titanium alloy to which one or more alloy elements are added, but the amount of addition is small, and they are modified pure titanium treated similarly to pure titanium.

Test number 13 is a titanium alloy of Ti-1Fe-0.350, test number 14 is a titanium alloy of Ti-5Al-1Fe, test number 15 is a titanium alloy of Ti-5Al-1Fe-0.25Si, test number 16 is a titanium alloy of Ti-3Al-2.5V, test number 17 is a titanium alloy of Ti-4.5Al-2Mo-1.6V-0.5Fe-0.3Si-0.03C (ASTM Gr. 35), test number 18 is Ti-4.5Al-2Fe-2Mo-3V, test number 19 is Ti-1Cu, test number 20 is Ti-1Cu-0.5Nb, and test number 21 is Ti-1Cu-1Sn-0.3Si-0.2Nb.

Outer layer heating treatment was performed on the front surface of each of these slabs, then the slab was inverted, and outer layer heating treatment was performed on the back surface. After that, electron beam irradiation was performed on the side surfaces in a similar manner.

Each of these slabs was inserted into a furnace at 820° C. and was then heated for approximately 240 minutes, the resulting piece was processed by a continuous hot rolling strip mill to produce a hot rolled sheet coil with a thickness of 5 mm, the sheet was passed through a continuous pickling line of nitrohydrofluoric acid, and the resulting piece was melted off approximately 50 μm per surface. After that, both sheet surfaces were visually observed to measure the number of surface defects.

The examples of these test numbers 8 to 21 are Examples of the present invention; and as shown in Table 2A and Table 2B, each of them had the form of the outer layer portion prescribed in the present invention, exhibited a structure with the crystal grain size prescribed in the invention of the present application after heat treatment equivalent to hot rolling heating, and had few surface defects after hot rolling and achieved the passing grade.

<Test Numbers 22 to 24 (Table 3A and Table 3B)>

Test number 22 is a cast product of a slab of JIS class 1 pure titanium with a cross section of 1000 mm wide×190 mm thick and a length of 5000 mm produced by DC casting by electron beam remelting, test number 18 is a cast product of a slab of JIS class 1 pure titanium with a cross section of 950 mm wide×165 mm thick and a length of 4500 mm produced by DC casting by electron beam remelting, and test number 24 is a cast product with the same dimensions as test number 22 produced by DC slab casting by plasma arc melting.

Outer layer heating treatment was performed on the front surface of each of these slabs, then the slab was inverted, and outer layer heating treatment of the first stage was performed on the back surface. After that, electron beam irradiation was performed on the side surfaces in a similar manner. At this time, the irradiation conditions were variously altered.

Each of these slabs was inserted into a furnace at 820° C. and was then heated for approximately 240 minutes, the resulting piece was processed by a continuous hot rolling strip mill to produce a hot rolled sheet coil with a thickness of 5 mm, the sheet was passed through a continuous pickling line of nitrohydrofluoric acid, and the resulting piece was melted off approximately 50 μm per surface. After that, both sheet surfaces were visually observed to measure the number of surface defects.

In these test numbers 22 to 24, the dimensions are smaller than those of test number 1 etc. and accordingly also the heat capacity is smaller, and therefore the cooling rate tends to be slower; but these test numbers exhibited a structure with the crystal grain size prescribed in the invention of the present application, and had few surface defects after hot rolling and achieved the passing grade.

The invention claimed is:

1. A titanium cast product for hot rolling made of titanium, the titanium cast product for hot rolling comprising, on a surface serving as a rolling surface:
a fine structure layer made of grains finer than grains of a matrix layer, the fine structure layer being formed by melting and re-solidification,
wherein the fine structure layer comprises a smallest portion and a largest portion, wherein the smallest portion has a thickness of more than or equal to 5 mm in depth and the largest portion has a thickness of less than 9 mm in depth, and
a proportion of crystal grains each having a grain size of more than or equal to 1 mm in a position at ½ of the average thickness of the fine structure layer is less than 15%.

2. The titanium cast product for hot rolling according to claim 1, wherein the titanium cast product for hot rolling is made of commercial pure titanium or a titanium alloy.

3. A method for producing the titanium cast product for hot rolling according to claim 1,
the method comprising:
an outer layer heating treatment step of heating a surface serving as a rolling surface of hot rolling of a cast product material made of titanium by electron beam irradiation and thereby heating an area more than or equal to 5 mm and less than 9 mm in depth from the surface to higher than or equal to β transformation temperature; and
a cooling step of, after the outer layer heating treatment step, performing cooling to a temperature lower than the β transformation temperature;
wherein the superimposition of the electron beam between a not-irradiated area and an irradiated area is more than or equal to 5 mm and less than 20 mm.

4. A method for producing the titanium cast product for hot rolling according to claim 2,
the method comprising:
an outer layer heating treatment step of heating a surface serving as a rolling surface of hot rolling of a cast product material made of titanium by electron beam irradiation and thereby heating an area more than or equal to 5 mm and less than 9 mm in depth from the surface to higher than or equal to β transformation temperature; and
a cooling step of, after the outer layer heating treatment step, performing cooling to a temperature lower than the β transformation temperature;
wherein the superimposition of the electron beam between a not-irradiated area and an irradiated area is more than or equal to 5 mm and less than 20 mm.

5. The method for producing the titanium cast product for hot rolling according to claim 3, wherein, in the outer layer heating treatment step, electron beam irradiation is performed while an electron beam irradiation gun is continuously moved in a direction parallel to the surface of the cast product material.

6. The method for producing the titanium cast product for hot rolling according to claim 3, wherein the cooling step is performed by heat removal from a matrix side of the cast product material.

7. The method for producing the titanium cast product for hot rolling according to claim 3, wherein the cast product material is casted by a DC slab casting method.

8. The method for producing the titanium cast product for hot rolling according to claim 3, wherein the cast product material has an as-cast casting surface.

* * * * *